UNITED STATES PATENT OFFICE.

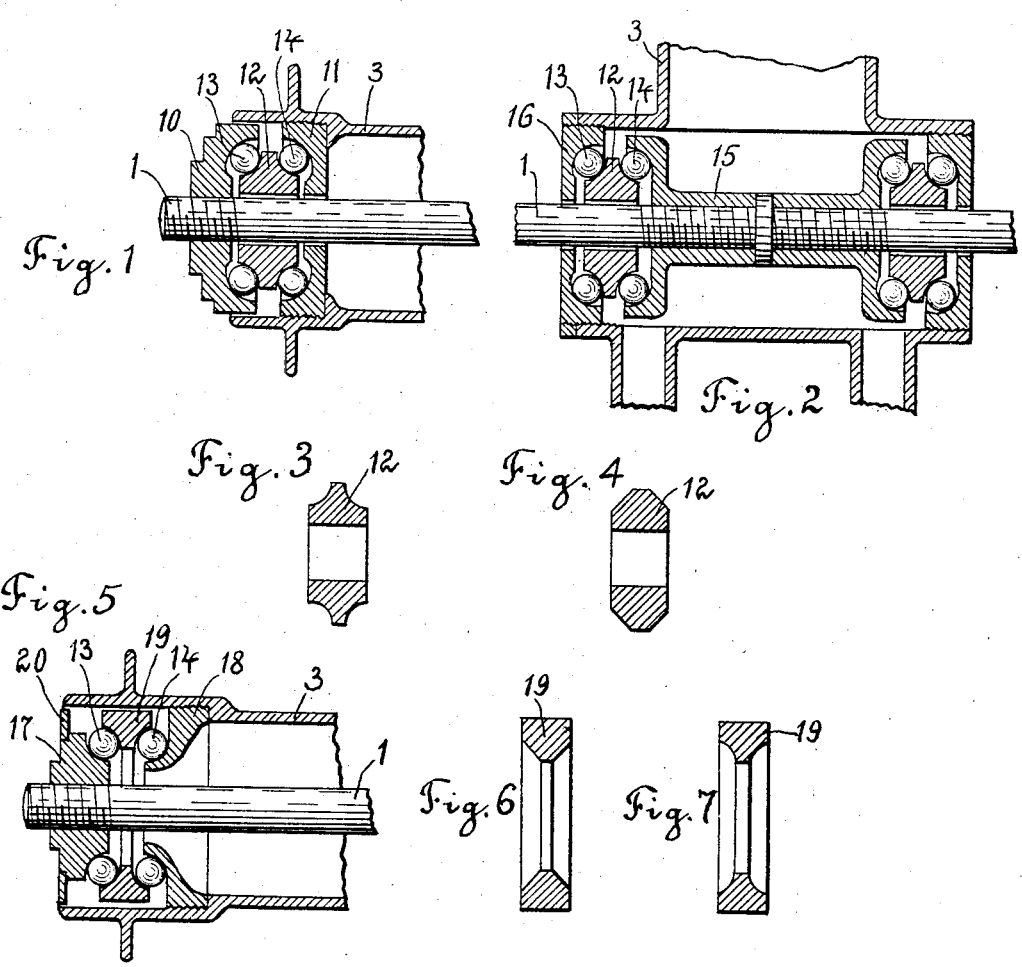

NICOLAS N. SHAIDUROFF, OF NEW YORK, N. Y.

BALL-BEARING.

No. 895,901.   Specification of Letters Patent.   Patented Aug. 11, 1908.

Application filed April 4, 1907. Serial No. 366,416.

*To all whom it may concern:*

Be it known that I, NICOLAS N. SHAIDUROFF, a citizen of the Russian Empire, and resident of New York, in the county of New York and State of New York, have invented certain new and useful Improvements in Ball-Bearings, of which the following is a specification.

The present invention relates to ball bearings and has for its object to provide an organization of parts in which the friction of the bearing elements is decreased considerably below the amount of friction which usually exists in devices of this general character heretofore known. This result is obtained by arranging the usual bearing balls between the ball seat of the hub and that of the shaft in such a manner that only a minimum of surface of the bearing elements is in operating contact while the power or weight may be so distributed, if desired by means of auxiliary bearing rings, as to produce the most favorable conditions of rolling friction and eliminate entirely those of gliding friction.

The accompanying drawings illustrate the invention in some of its forms of construction and Figures 1, 2, and 5 of the same are vertical cross sections in the axis of the shaft and Figs. 3, 4, 6 and 7 similar views of the bearing rings preferably employed therein.

The reference numeral 1 in all the figures indicates a shaft or axle, for instance of a bicycle, automobile or any other machine in which rotatable members are employed.

The device illustrated in Fig. 1 employs a loose bearing ring 12. A ball cup 10, having an internal ball seat is connected to the shaft 1, and a bearing member 11, also having an internal ball seat, is connected to the hub 3. The bearing ring 12, loosely mounted on the shaft 1, is located between the bearing members 10 and 11 and has external ball seats. A pair of sets of bearing balls 13 and 14 are held, respectively, by the bearing members 10 and 11 and the bearing ring 12. The pressure upon the shaft is transmitted by the upper part of the bearing plate 10 to the upper bearing balls of the set 13, the bearing ring 12, the lower bearing balls of the set 14, the bearing plate 11 and to the hub 3.

In Fig. 2 an entire hub of an automobile or bicycle is shown and the sleeve 15, secured to the shaft 1, is provided with bearing members, having internal ball seats; in a similar manner the bearing members 16, secured to the hub 3 are provided with internal ball seats while the bearing rings 12, located between the bearing members and being of symmetrical cross section, have external ball seats. Pressure exerted upon the shaft 1 is transmitted to the hub and wheel in the manner already indicated.

If it should be desired, another form of a ball bearing, embodying the same general principle may be employed and the same is illustrated in Fig. 5. In this case the bearing member 17 of the shaft 1, and the bearing member 18 of the hub, are provided with external ball seats, while the loose bearing ring 19 being of symmetrical cross section has internal ball seats. A dust guard 20 prevents dust, grit, etc. to enter into the bearing. The loose bearing rings 12 and 19 may have concaved ball seats or straight ball seats, as indicated in Figs. 3 and 7, or Figs. 4 and 6, respectively, and any number of such loose bearing rings may be employed in a single bearing.

As new and useful is claimed and desired to be secured by Letters Patent of the United States:—

1. The combination with a hub, of a bearing member secured thereto and having an internal concaved ball seat, a shaft, a bearing member directly secured thereto and having an internal concaved ball seat, a bearing ring loosely mounted on said shaft between said bearing members and having an external annular ball seat on each side, and a pair of sets of bearing balls contacting, respectively, with the ball seats of the bearing ring and the ball seats of the corresponding bearing members.

2. The combination with a hub, of a bearing member secured thereto and having a ball seat, a shaft, a bearing member directly secured thereto and having a similar ball seat, a bearing ring of symmetrical cross section loosely mounted on said shaft between said bearing members and having an annular ball seat on each side, and a pair of sets of bearing balls contacting, respectively, with the ball seats of the bearing ring and the ball seats of the corresponding bearing members.

In witness whereof the inventor has hereunto set his hand in the presence of two subscribing witnesses, at New York, in the county of New York and State of New York, this 22nd day of March, 1907.

NICOLAS N. SHAIDUROFF.

In presence of—
VLADIMIR F. GNESIN,
RALPH J. SACHERS.